US006786324B2

(12) United States Patent
De Raad

(10) Patent No.: US 6,786,324 B2
(45) Date of Patent: Sep. 7, 2004

(54) GUIDE FOR RECIPROCALLY MOVABLE SLATS

(75) Inventor: Frans Arian Heino De Raad, Coevorden (NL)

(73) Assignee: Cargo Floor B.V., Coevorden (NL)

( * ) Notice: Subject to any disclaimer, the term of this patent is extended or adjusted under 35 U.S.C. 154(b) by 0 days.

(21) Appl. No.: 10/291,142

(22) Filed: Nov. 8, 2002

(65) Prior Publication Data

US 2003/0091246 A1 May 15, 2003

(30) Foreign Application Priority Data

Nov. 9, 2001 (NL) .............................................. 1019340

(51) Int. Cl.[7] .............................................. B65G 25/00
(52) U.S. Cl. .............................. 198/750.4; 198/750.1; 198/750.2
(58) Field of Search .......................... 198/750.4, 750.1, 198/750.2; 414/525.1

(56) References Cited

U.S. PATENT DOCUMENTS

| | | | | |
|---|---|---|---|---|
| 4,785,929 A | | 11/1988 | Foster ......................... | 198/750 |
| 4,858,748 A | * | 8/1989 | Foster ......................... | 198/750.4 |
| 4,940,132 A | * | 7/1990 | Foster ......................... | 198/750.3 |
| 5,139,133 A | * | 8/1992 | Foster ......................... | 198/750.3 |
| 5,238,360 A | * | 8/1993 | Foster ......................... | 414/525.9 |
| 5,323,894 A | * | 6/1994 | Quaeck ....................... | 198/750.3 |
| 5,355,994 A | * | 10/1994 | Foster ......................... | 198/750.2 |
| 5,419,426 A | * | 5/1995 | Foster ......................... | 198/750.4 |
| 5,996,772 A | * | 12/1999 | Foster ......................... | 198/750.3 |
| 6,006,895 A | * | 12/1999 | Foster et al. ................ | 198/750.4 |
| 6,013,585 A | * | 1/2000 | Foster et al. ................ | 442/43 |
| 6,019,215 A | * | 2/2000 | Foster ......................... | 198/750.3 |
| 6,257,396 B1 | * | 7/2001 | Quaeck ....................... | 198/750.3 |
| 6,585,106 B1 | * | 7/2003 | Foster ......................... | 198/750.4 |

FOREIGN PATENT DOCUMENTS

GB 2039262 8/1980

* cited by examiner

*Primary Examiner*—Douglas Hess
(74) *Attorney, Agent, or Firm*—Ladas & Parry

(57) ABSTRACT

Guide for slats of a reciprocally moving floor of a transport or loading surface, stationary or mobile, such as a loading floor of a trailer, the slats being supported on locations that are spaced apart in slat direction, on rectangular tubular longitudinal profiles that may or may not be continuous, guides being arranged between the longitudinal profiles and the slats, which guides substantially have an inverted U-shape with an upper body situated on top of the longitudinal profile and two legs on either side of the longitudinal profile extending downward from the upper body, at least one of which legs being provided with a flange at the lower end for engagement of the lower surface of the longitudinal profile, the guide being designed for keeping the longitudinal profile between the legs and between the flange and the upper body, the one portion of the portions of the legs situated opposite each other on either side being shortened into a short protrusion engaging over the upper corner of the longitudinal profile and the other portion being provided with said flange.

14 Claims, 5 Drawing Sheets

GUIDE FOR RECIPROCALLY MOVABLE SLATS

Reciprocally movable slats are used in transport or loading floors, such as trailers or in loading/unloading terminals. The slats are then moved in several groups at a time in a transport direction for the load placed on the slats, and after that per group consecutively in an opposite direction.

The reciprocal sliding of the slats is enhanced by placing synthetic guides between the supporting structure and the slats, which guides have a low friction coefficient. The supporting structure for the slats usually comprises a—rectangular—longitudinal tube for each slat, which longitudinal tubes themselves are supported on cross beams, which in turn are supported on main beams, for instance chassis beams of a trailer. The guides are then placed at the location of the crossings of longitudinal tubes/cross beams, and possibly in between.

The guides have an inverted U-shape, having two legs which at their lower ends are provided with inwardly extending flanges. The legs/flanges are flexible to such an extent that when placed from above they are able to spread onto/over the longitudinal tube and after the flanges have arrived at the lower side of the longitudinal tubes are able to snap back in order to clamp under the longitudinal tubes. The guides are then fixedly clamped on the longitudinal tubes in vertical and horizontal sense.

The legs—as considered in longitudinal direction—are divided into two portions, which engage on either side of the cross beam, so that the guide is also secured in longitudinal direction.

Placing the guides requires quite some strength. Often tools adjusted for that purpose are needed. As a result the placing of the guides may be time-consuming.

It is an object of the invention to improve on this.

It is a further object of the invention to provide a guide of the type mentioned in the preamble which is easy to place.

It is a further object of the invention to provide a guide of the type mentioned in the preamble which is easy to remove.

It is a further object of the invention to provide a guide of the type mentioned in the preamble which is lightweight.

From one aspect according to the invention a guide is provided for slats of a reciprocally moving floor of a transport or loading surface, stationary or mobile, such as a loading floor of a trailer, the slats being supported on locations that are spaced apart in slat direction, on rectangular tubular longitudinal profiles that may or may not be continuous, guides being arranged between the longitudinal profiles and the slats, which guides substantially have an inverted U-shape with an upper body situated on top of the longitudinal profile and two legs on either side of the longitudinal profile extending downward from the upper body, at least one of which legs being provided with a flange at the lower end for engagement of the lower surface of the longitudinal profile, the guide being designed for keeping the longitudinal profile between the legs and between the flange and the upper body, the one portion of the portions of the legs situated opposite each other on either side being shortened into a short protrusion engaging over the upper corner of the longitudinal profile and the other portion being provided with said flange.

In that way the weight of the guide can thus be kept limited and be arranged in a substantially horizontal motion in a simple manner, that means substantially parallel to the planes of the longitudinal tubes which are the most important to be engaged. After all, the adjacent slats would otherwise have freedom of movement in vertical direction.

Preferably both legs have a shortened portion and an opposite portion provided with a flange. As a result an equal sideward confinement in both directions is obtained. Preferably the portions provided with a flange and the portions having shortened legs present in both legs are situated in a rotation symmetrical manner with respect to each other. The guides can thus easily be arranged by means of a rotational motion about a vertical axis.

The protrusion can be rib-shaped, particularly continuous, for an engagement length that is as large as possible.

Preferably the protrusion is snappable over the longitudinal profile, for enhancing the reliability of the attachment.

Arrangement in a horizontal motion is enhanced when the portion provided with a flange is resilient.

When the longitudinal profiles at their lower sides are attached to cross beams the flange can be absent at the location of the cross beams.

The fixation on the longitudinal tubes in vertical sense is further improved when the flanges extend beyond the centre of the lower side of the longitudinal profiles.

Hindrance by a possibly present cross beam is avoided when the legs are situated at the longitudinal ends of the guide, and both portions as seen in longitudinal direction leave a recess extending up to the upper body free between them. Moreover weight is then further economized on.

From another aspect the invention provides a guide for slats of a reciprocally moving floor of a transport or loading surface, such as a loading floor of a trailer, the slats being supported on locations that are spaced apart in slat direction, on rectangular tubular longitudinal profiles that may or may not be continuous, guides being arranged between the longitudinal profiles and the slats, which guides substantially have an inverted U-shape with an upper body situated on top of the longitudinal profile and two legs situated on either side of the longitudinal profile extending downward from the upper body, which legs are provided with a flange at the lower end for engagement of the lower surface of the longitudinal profile, the guide being designed for keeping the longitudinal profile between the legs and between the flanges and the upper body, the legs, as seen in longitudinal direction, having a shortened leg portion and a leg portion with flange, wherein seen in projection on a longitudinal plane perpendicular to the upper plane the leg portions provided with flange do not coincide.

In a further development of this according to the invention as seen in projection on a longitudinal plane perpendicular to the upper plane, the leg portions with flange are situated at an intermediate distance from each other.

The invention further relates to a transport or loading floor having reciprocally moving slats, the slats being supported and guided on guides according to the invention.

The invention will be elucidated on the basis of an exemplary embodiment shown in the attached drawings, in which:

FIG. 1 is a view in perspective of an example of a guide according to the invention;

FIG. 2A–C is an end view, a side view and a bottom view, respectively, of the guide of FIG. 1;

Figure 1:
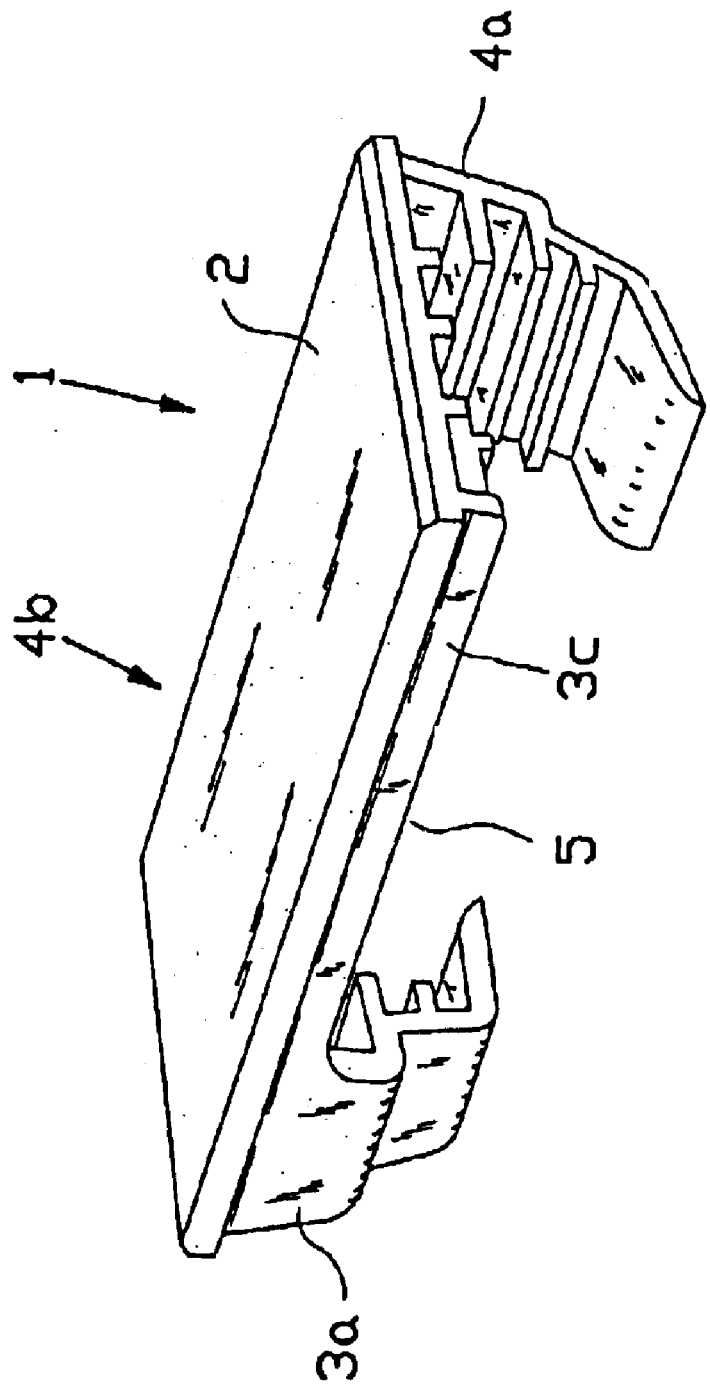

The guide 1 shown in FIG. 1 is made of HDPE and has an elongated upper plate 2, from the lower side of which near the one end a long leg 4$a$ and a—recessed—short leg 3$b$ and near the other end a long leg 3$a$ and an—also recessed—short leg 4$b$ extend downward. Adjacent to said legs 3$a$ and 4$a$ a short longitudinal rib 3$c$ or 4$c$, respectively, is formed, to increase the rigidity.

Figure 2:
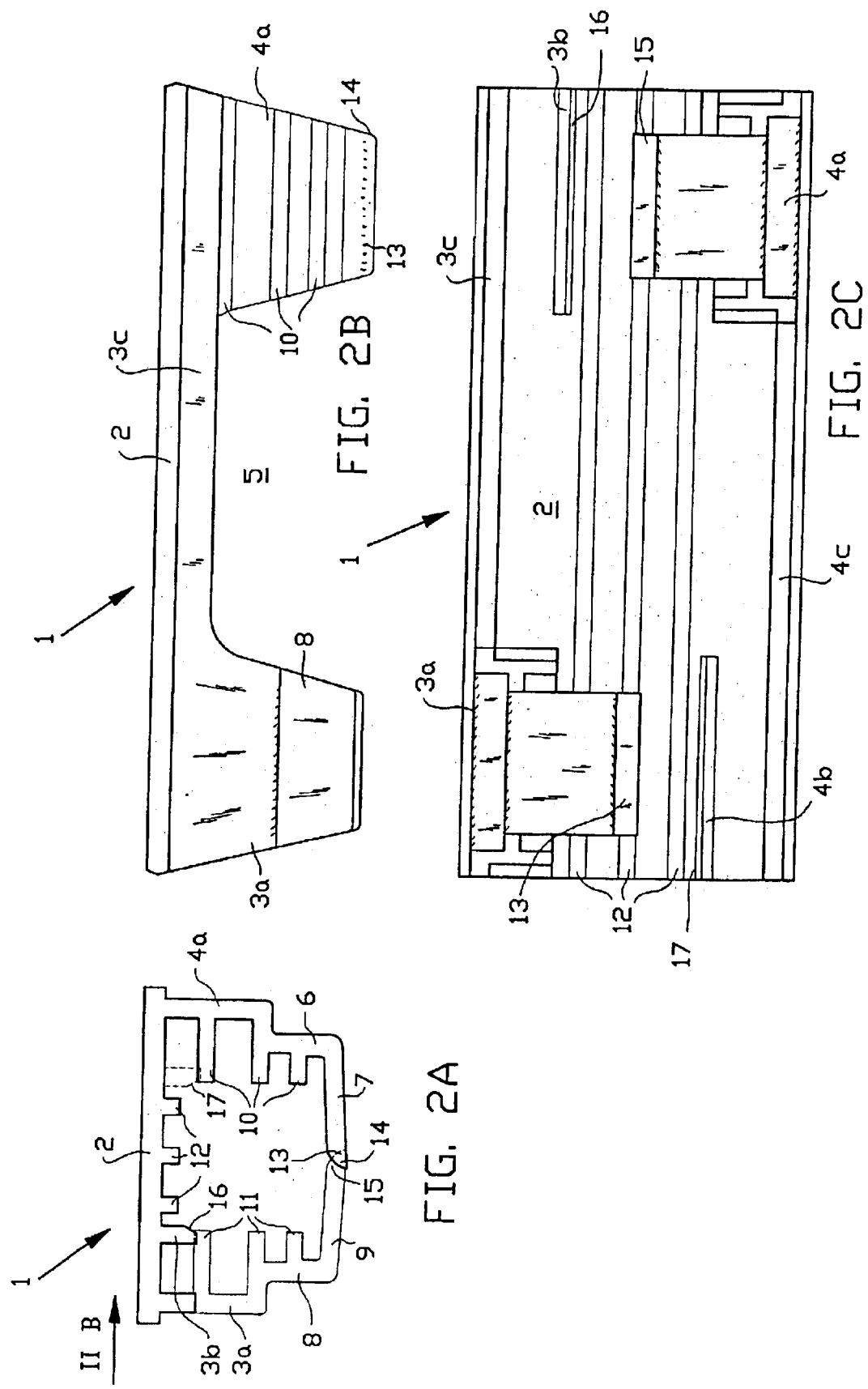

As can clearly be seen in the FIGS. 2A–C the legs 3a and 4a are rotation symmetrical with respect to each other, and the same goes for the short legs 3b and 4b.

The long legs 3a and 4a are L-shaped, and at the inner side have ribs 10 and 11, which form supporting surfaces with their ends, which are situated in a vertical plane. In the lowermost portions 8 and 6 the legs 3a and 4a are offset to the inside, and at their lower ends they change into inclined slightly inwardly extending, almost horizontal end portions or flanges 9 and 7, which end in edges 14 and 15, where they are provided with rounded-off surfaces 13. As can be seen in FIG. 2A the end portions 9 and 7 overlap each other in the projection shown.

At the lower side of the upper plate 2 longitudinal ribs 12 are formed, in which it is noted that the short legs 3b and 4b extend further downward than the ribs 12. The short legs 3b and 4b are bevelled at the inside by means of pilot edges 16 and 17, and with their inner surfaces are furthermore aligned with the supporting surfaces of the ribs 10 and 11.

Figure 5:
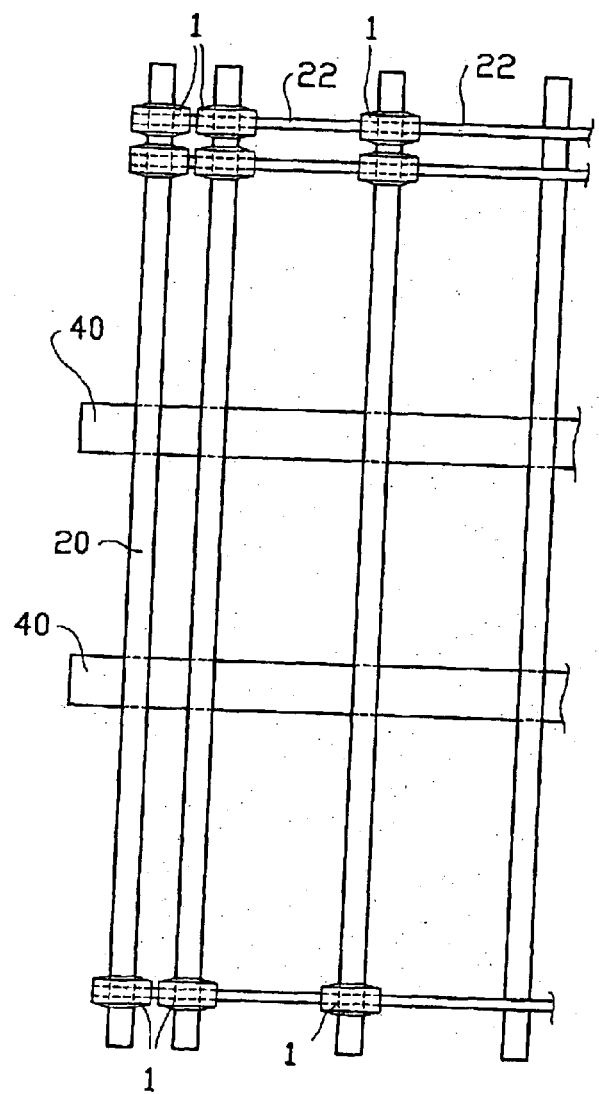
FIG. 5 is a schematic top view of a support structure for a loading floor having guides according to FIG. 1.

In FIG. 5 a possible structure of a loading floor is shown, in which the loading surface will be formed by reciprocally moving slats, according to the widely known principle of a reciprocating floor. By means of 40 the main beams of a chassis are shown, on which—in this case—I-profile-shaped cross beams 20 have been placed. On the cross beams 20 longitudinal girders 22 are attached, and at the location of the crossings of the longitudinal girders 22 with the cross beams 20 the guides 1 have been placed.

Figure 3:
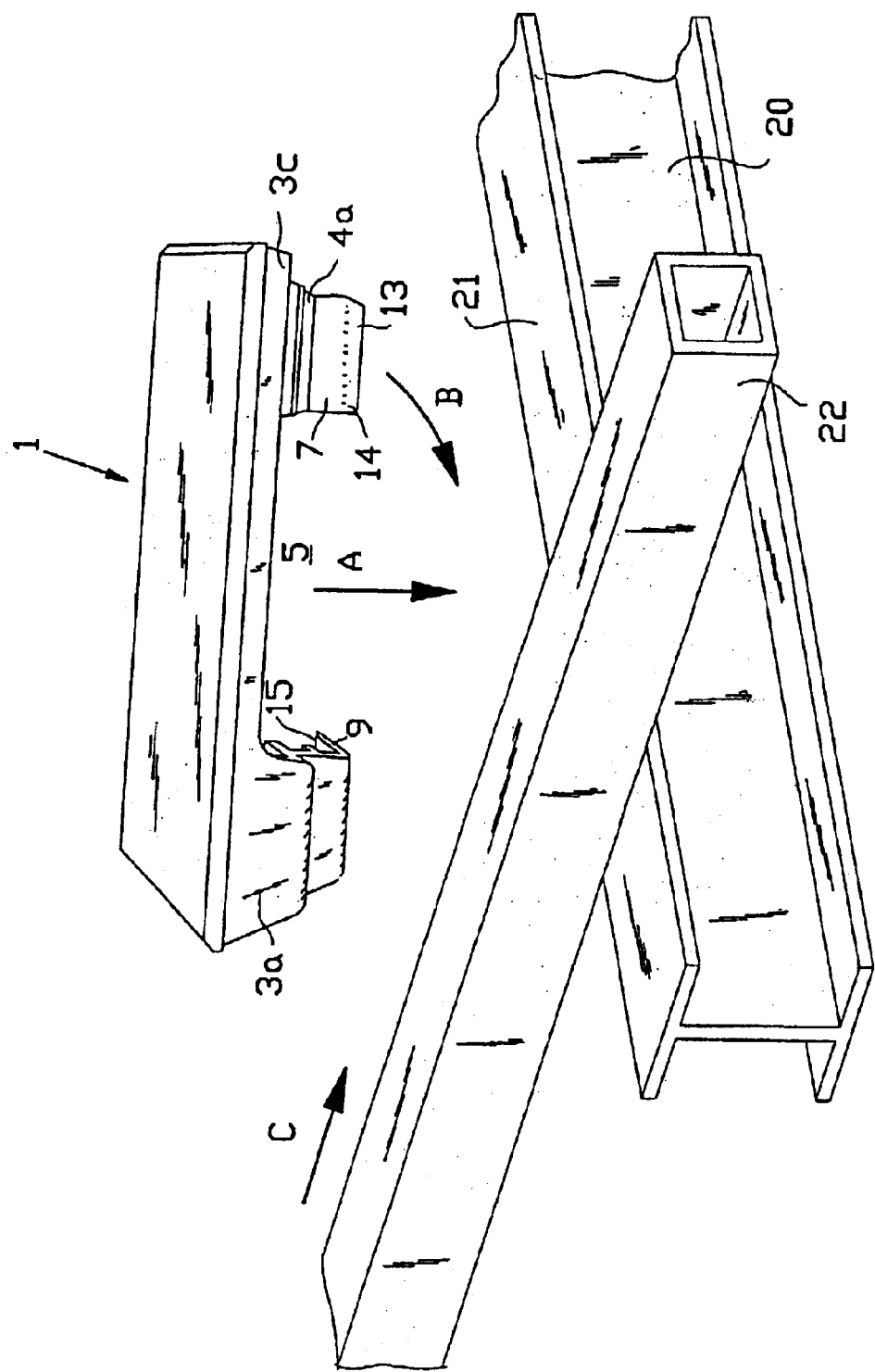
FIG. 3 is the guide of FIG. 1 during the action of being placed.

When placing the guide 1 (see FIG. 3) it is simple picked up by hand and it is taken in the direction A, or inclined, at the location of the crossing of the cross beam 20 and the longitudinal girder 22 with the lower side of the ribs 12 on the top surface of the longitudinal girder 22, but then such that the ends of the legs 3a and 4a move past the sides of the longitudinal girders 22, and extend just next to the edges of the flanges of the upper side 21 of the cross beam 20. The guide 1 is therefore kept oblique with respect to the main direction C of the longitudinal girders 22.

Subsequently the guide 1 is manually made to make a rotational movement about a vertical axis in the direction B, in which the bent surfaces 13 of the end portions 9 and 7 run onto the lower edges of the longitudinal girders 22, and the end portions 9 and 7 are bent slightly downward.

Figure 4:
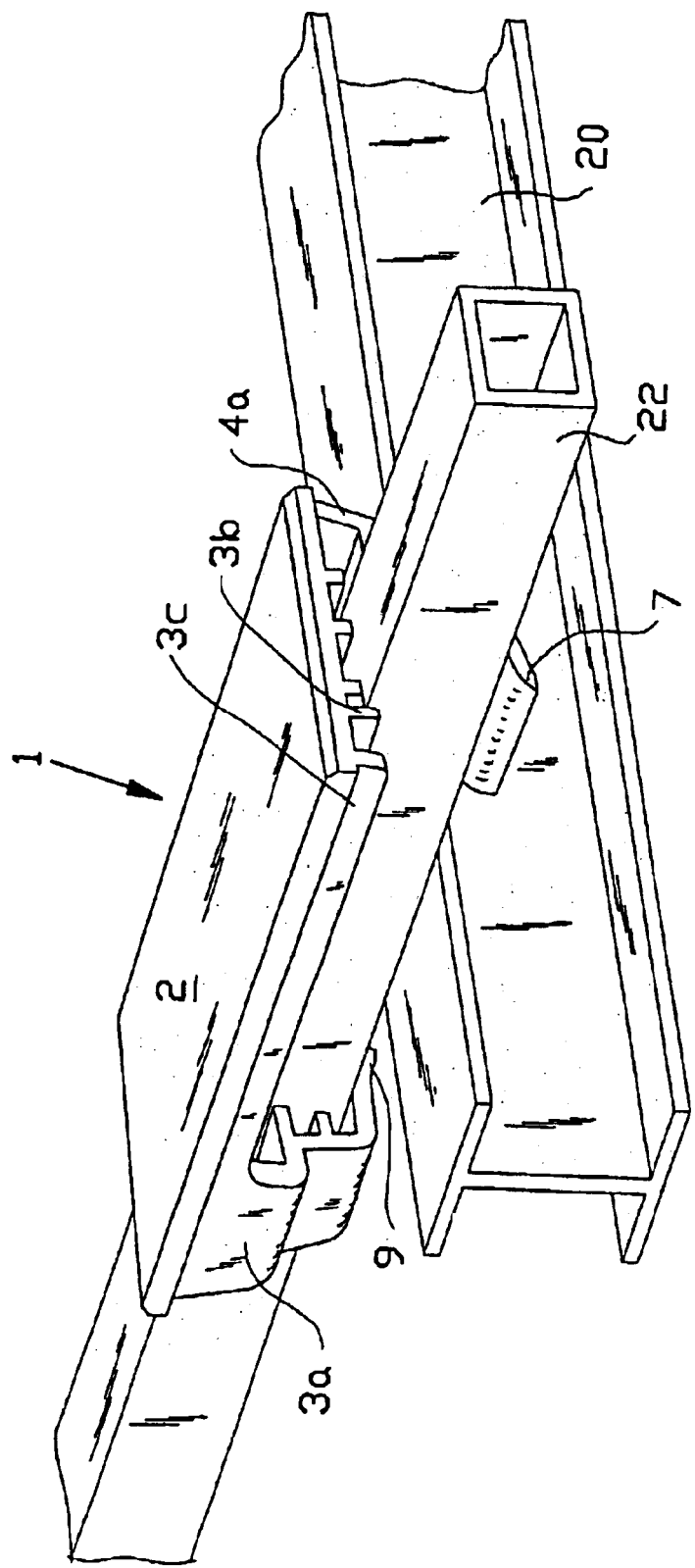
FIG. 4 is the guide of FIG. 1 after being placed.

Due to the deformability of the end portions 9 and 7 the short legs 3b and 4b can move over the upper edges of the longitudinal girder 22 assisted by the pilot edges 16, 17. When rotating, the ribs 12 are somewhat released from the upper surface of the longitudinal girder 22. When the situation in FIG. 4 is achieved, and the guide 1 is aligned with the longitudinal girder 22, the short legs 3b and 4b have been snapped at the other side of the longitudinal girder 22. The guide 1 is then clamped on the longitudinal 22, on either side of the cross beam 20, whereby the longitudinal girder 22 is horizontally clamped in between the short legs 3b and 4b on the one hand and the end planes of the ribs 11 and 10 of the long legs 3a and 4a on the other hand. The guide 1 here is centrally secured. In the vertical sense the longitudinal girder 22 is clamped in by the top surfaces of the end portions or flanges 7 and 9 on the one hand and the lower surfaces of the ribs 12 on the other hand.

Figure 6:
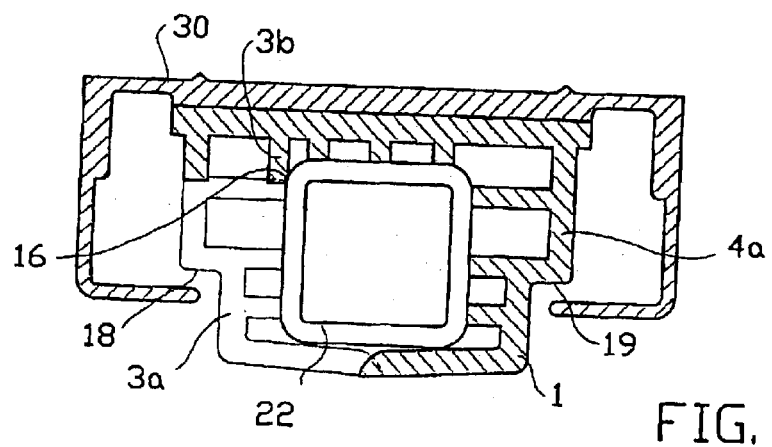
FIG. 6 is a cross-section of a placed guide with a slat supported on it.

When all guides 1 have been placed, the slats 30 can be placed, whereby they are slid in in longitudinal direction of the longitudinal girders 22, and engage about the guides 1, as shown in FIG. 6. The slats 30 here support on the upper surface 2 of the guides 1, and can be reciprocally moved over them in the direction C. The slats 30 are retained against lifting by the shoulders 18 and 19 of the legs 3a and 4a of the guide 1, which itself is secured on the longitudinal girder 22.

What is claimed is:

1. In a guide for slats of a reciprocally moving floor of a stationary or mobile transport or loading surface, the improvements wherein the slats are supported at locations that are spaced apart in a slat direction on rectangular tubular longitudinal profiles that may or may not be continuous, guides are arranged between the longitudinal profiles and the slats, each of the guides substantially having an inverted U-shape with an upper body situated on top of one of the longitudinal profiles, a first leg and a shorter leg on opposite sides of the one of the longitudinal profiles extending downward from the upper body, at least the first leg being provided with a flange at the lower end for engagement of a lower surface of the one of the longitudinal profiles for keeping the one of the longitudinal profiles between the legs and between the flange and the upper body, an end of the shorter leg being a short protrusion engaging over an upper corner of the one of the longitudinal profiles.

2. Guide according to claim 1, both legs having a shortened portion and an opposite portion provided with a flange.

3. Guide according to claim 2, the portions provided with a flange and the portions having shortened legs present in both legs being situated in a rotation symmetrical manner with respect to each other.

4. Guide according to claim 1, the protrusion being rib-shaped.

5. Guide according to claim 1, the protrusion being snappable over the longitudinal profile.

6. Guide according to claim 1, the portion provided with a flange being resilient.

7. Guide according to claim 1, the longitudinal profiles at their lower sides being attached to cross beams the flange being absent at the location of the cross beams.

8. Guide according to claim 1, flanges extending beyond the centre of the lower side of the longitudinal profiles.

9. Guide according to claim 1, the legs being situated at the longitudinal ends of the guide, and both portions as seen in longitudinal direction leaving a recess extending up to the upper body free between them.

10. Guide according to claim 1, wherein the reciprocally moving floor is a loading floor and the transport is a trailer.

11. Transport or loading floor having reciprocally moving slats, the slats being supported and guided on guides according to claim 1.

12. Guide for slats of a reciprocally moving floor of a transport or loading surface, the slats being supported on locations that are spaced apart in slat direction, on rectangular tubular longitudinal profiles that may or may not be continuous, guides being arranged between the longitudinal profiles and the slats, which guides substantially have an inverted U-shape with an upper body situated on top of the longitudinal profile and two legs situated on either side of the longitudinal profile extending downward from the upper body, which legs are provided with a flange at the lower end for engagement of the lower surface of the longitudinal profile, the guide being designed for keeping the longitudinal profile between the legs and between the flanges and the upper body, the legs, as seen in longitudinal direction, having a shortened leg portion and a leg portion with flange, wherein seen in projection on a longitudinal plane perpendicular to an upper plane, the leg portions provided with flange do not coincide.

13. Guide according to claim 11, wherein seen in projection on a longitudinal plane perpendicular to the upper plane, the leg portions with flange are situated at an intermediate distance from each other.

14. Transport or loading floor having reciprocally moving slats, the slats being supported and guided on guides according to claim 11.

* * * * *